United States Patent
Shen

(10) Patent No.: US 9,744,867 B1
(45) Date of Patent: Aug. 29, 2017

(54) CHARGER EXTENSION CABLE FOR ELECTRIC CAR

(71) Applicant: A-Ching Shen, Hsenchu (TW)

(72) Inventor: A-Ching Shen, Hsenchu (TW)

(73) Assignee: LEADING STAND, Hsenchu Taiping (TW)

( * ) Notice: Subject to any disclaimer, the term of this patent is extended or adjusted under 35 U.S.C. 154(b) by 0 days.

(21) Appl. No.: 15/465,153

(22) Filed: Mar. 21, 2017

(30) Foreign Application Priority Data

Sep. 8, 2016 (CN) ..................... 2016 2 1044799 U

(51) Int. Cl.
*H01R 11/00* (2006.01)
*B60L 11/18* (2006.01)
*H01R 13/66* (2006.01)
*H01R 13/713* (2006.01)
*H02J 7/00* (2006.01)

(52) U.S. Cl.
CPC ...... *B60L 11/1818* (2013.01); *H01R 13/6683* (2013.01); *H01R 13/713* (2013.01); *H02J 7/0045* (2013.01); *H01R 2201/26* (2013.01)

(58) Field of Classification Search
CPC ............ B06L 11/1818; H01R 13/6683; H01R 13/6666; H01R 13/713; H01R 2201/26; H02J 7/0045

USPC ......... 439/502–507, 620.08, 620.21, 620.22, 439/620.26

See application file for complete search history.

(56) References Cited

U.S. PATENT DOCUMENTS

| 6,259,170 B1 * | 7/2001 | Limoge ................. B60Q 1/305 307/10.1 |
| 7,540,767 B1 * | 6/2009 | Czarnecki ............ G01R 1/0408 320/114 |
| 8,115,476 B1 * | 2/2012 | Czarnecki .............. G01D 4/002 324/142 |
| 8,133,073 B2 * | 3/2012 | Buchberger ............. H01R 9/03 200/51.03 |
| 9,444,207 B1 * | 9/2016 | Smith .................. H01R 31/065 |

\* cited by examiner

*Primary Examiner* — Khiem Nguyen

(57) ABSTRACT

A charger extension cable for an electric car is connected with a home circuit and a charging gun of the electric car, and the charger extension cable contains: a body. A plug connects with a home circuit, and the plug connects with an electromagnetic protection switch via a first extension part, wherein an output end of the electromagnetic protection switch connects with a measuring meter, and an output end of the measuring meter couples with a first socket via a second extension part, the first socket is applied to connect with the charging gun.

4 Claims, 1 Drawing Sheet

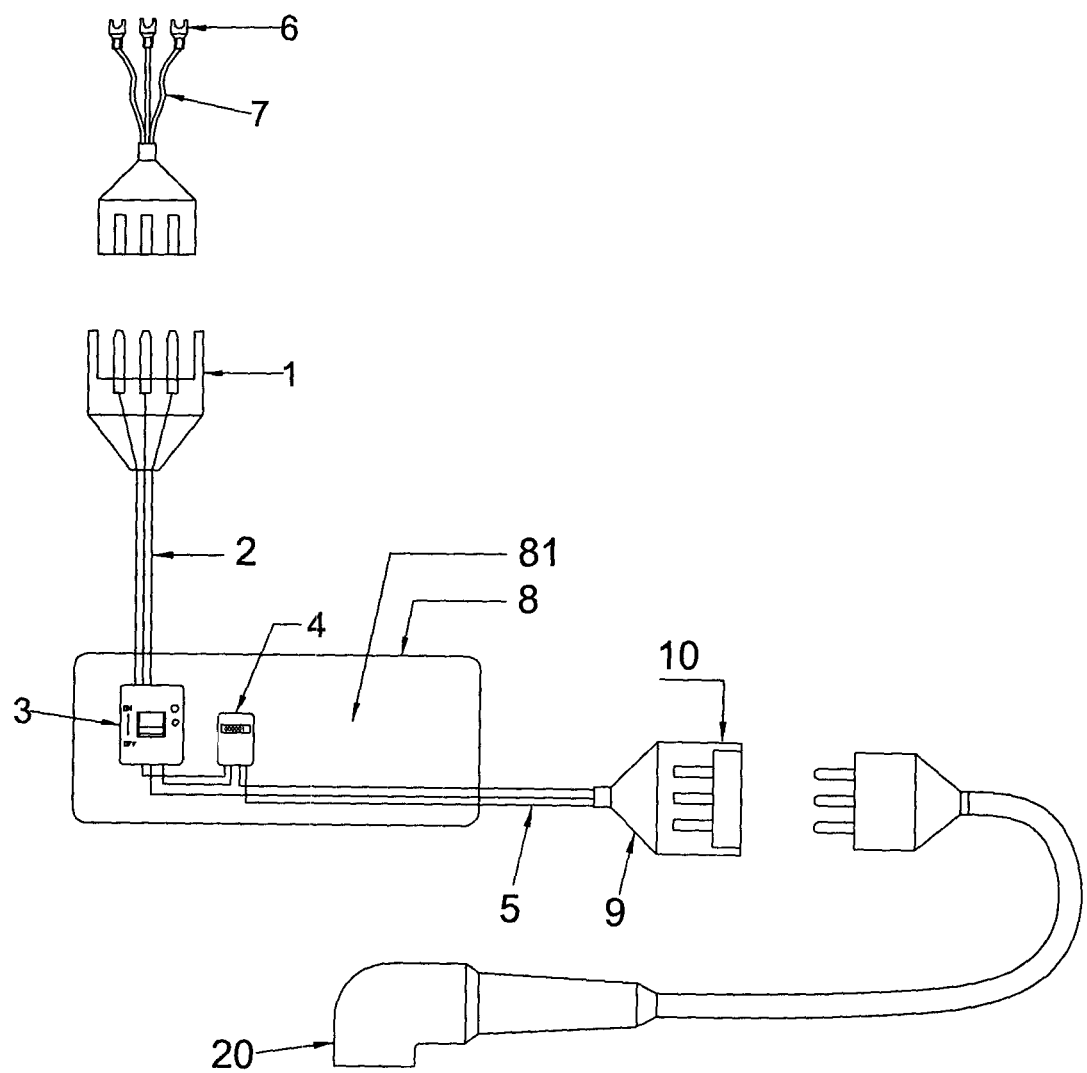

CHARGER EXTENSION CABLE FOR ELECTRIC CAR

FIELD OF THE INVENTION

The present invention relates to a charger extension cable for an electric car.

BACKGROUND OF THE INVENTION

An electric car charges electricity at a charging station or by using charging post, but a number of the charging station and the charging post is limited.

The present invention has arisen to mitigate and/or obviate the afore-described disadvantages.

SUMMARY OF THE INVENTION

The primary objective of the present invention is to provide a charger extension cable which enhances safety of charging electricity and connects with a home circuit so as so charge electricity easily and quickly.

To obtain the above mentioned objective, a charger extension cable for an electric car provided by the present invention is connected with a home circuit and a charging gun of the electric car, and the charger extension cable contains: a body. The body includes a plug connecting with a home circuit, and the plug connecting with an electromagnetic protection switch via a first extension part, wherein an output end of the electromagnetic protection switch connects with a measuring meter, and an output end of the measuring meter couples with a first socket via a second extension part, the first socket is applied to connect with the charging gun.

The charger extension cable further contains a circuit connector, and the circuit connecter includes an input terminal and a second socket, wherein the input terminal connects with an output end of an electricity meter in the home circuit, the second socket accommodates the plug of the body.

The charger extension cable further contains a protection case in which the electromagnetic protection switch and the measuring meter are housed, and the protection case has an accommodation cavity configured to accommodate the first extension part and the second extension part.

Preferably, the first socket has an insulation cover arranged thereon.

BRIEF DESCRIPTION OF THE DRAWINGS

FIG. 1 is a side plane view showing the assembly of a charger extension cable for an electric car according to a preferred embodiment of the present invention.

DETAILED DESCRIPTION OF THE PREFERRED EMBODIMENTS

With reference to FIG. 1, a charger extension cable for an electric car according to a preferred embodiment of the present invention is connected with a home circuit and a charging gun 20 of the electric car, and the charger extension cable comprises: a body, and the body includes a plug 1 connecting with the home circuit, and plug 1 connects with an electromagnetic protection switch 3 via a first extension part 2, wherein the electromagnetic protection switch 3 is employed to control a flow of electric current which passes through the electromagnetic protection switch 3. When the electric current passes the electromagnetic protection switch in large quantity, the electromagnetic protection switch 3 cuts off the electric current so as to protect the body. An output end of the electromagnetic protection switch 3 connects with a measuring meter 4, and an output end of the measuring meter 4 couples with a first socket 9 via a second extension part 5. The first socket 9 is applied to connect with the charging gun 20. The measuring meter 4 displays amount of charging power to a user.

The charger extension cable further comprises a circuit connector, and the circuit connecter includes an input terminal 6 and a second socket 7, wherein the input terminal 6 connects with an output end of an electricity meter in the home circuit, the second socket 7 accommodates the plug 1 of the body. Thereby, the plug 1 of the body connects with the second socket 7 so as to charge electricity easily.

The body further includes a protection case 8 in which the electromagnetic protection switch 3 and the measuring meter 4 are housed, and the protection case 8 has an accommodation cavity configured to accommodate the first extension part 2 and the second extension part 5, hence the charger extension cable is portable.

Preferably, the first socket 9 has an insulation cover 10 arranged thereon so as to avoid electric shock.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A charger extension cable for an electric car being connected with a home circuit and a charging gun of the electric car, and the charger extension cable comprises:
   a body including
   a plug connecting with a home circuit, and the plug connecting with an electromagnetic protection switch via a first extension part, wherein an output end of the electromagnetic protection switch connects with a measuring meter, and an output end of the measuring meter couples with a first socket via a second extension part, the first socket is applied to connect with the charging gun.

2. The charger extension cable as claimed in claim 1 further comprising a circuit connector, and the circuit connecter including an input terminal and a second socket, wherein the input terminal connects with an output end of an electricity meter in the home circuit, the second socket accommodates the plug of the body.

3. The charger extension cable as claimed in claim 1 further comprises a protection case in which the electromagnetic protection switch and the measuring meter are housed, and the protection case has an accommodation cavity configured to accommodate the first extension part and the second extension part.

4. The charger extension cable as claimed in claim 1, wherein the first socket has an insulation cover arranged thereon.

* * * * *